US011152983B2

(12) United States Patent
Su et al.

(10) Patent No.: US 11,152,983 B2
(45) Date of Patent: Oct. 19, 2021

(54) DATA TRANSMISSION CONTROL METHOD, NETWORK SIDE DEVICE AND TERMINAL SIDE DEVICE

(71) Applicant: CHINA ACADEMY OF TELECOMMUNICATIONS TECHNOLOGY, Beijing (CN)

(72) Inventors: Xin Su, Beijing (CN); Qiubin Gao, Beijing (CN); Chuanjun Li, Beijing (CN); Mengjun Wang, Beijing (CN); Rakesh Tamrakar, Beijing (CN); Runhua Chen, Beijing (CN); Hui Li, Beijing (CN); Qiuping Huang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 198 days.

(21) Appl. No.: 16/476,507

(22) PCT Filed: Feb. 7, 2018

(86) PCT No.: PCT/CN2018/075590
§ 371 (c)(1),
(2) Date: Jul. 8, 2019

(87) PCT Pub. No.: WO2018/130234
PCT Pub. Date: Jul. 19, 2018

(65) Prior Publication Data
US 2020/0059277 A1  Feb. 20, 2020

(30) Foreign Application Priority Data
Jan. 10, 2017  (CN) .......................... 201710016847.2

(51) Int. Cl.
*H04B 7/0456* (2017.01)
*H04L 5/00* (2006.01)
(Continued)

(52) U.S. Cl.
CPC ......... *H04B 7/0473* (2013.01); *H04B 7/0626* (2013.01); *H04L 1/0003* (2013.01);
(Continued)

(58) Field of Classification Search
CPC ... H04L 1/0003; H04L 5/0023; H04L 5/0051; H04L 5/10; H04L 7/0473; H04B 7/06; H04B 7/061; H04B 7/0626; H04B 7/063
See application file for complete search history.

(56) References Cited

U.S. PATENT DOCUMENTS

2013/0201840 A1* 8/2013 Sorrentino ............ H04L 5/0048
370/252
2013/0279437 A1* 10/2013 Ng ....................... H04L 25/0224
370/329
(Continued)

FOREIGN PATENT DOCUMENTS

CN   107251450 A   10/2017
CN   107370591 A   11/2017
(Continued)

OTHER PUBLICATIONS

First Office Action from TW app. No. 107104649, dated Apr. 3, 2019, with machine English translation.
(Continued)

*Primary Examiner* — Michael Thier
*Assistant Examiner* — Prince A Mensah
(74) *Attorney, Agent, or Firm* — Ladas & Parry, LLP

(57) ABSTRACT

The present disclosure provides a data transmission control method, a network side device and a terminal side device. The data transmission control method includes: mapping, by
(Continued)

a network side device, a codeword to at least one data layer; mapping, by the network side device, the at least one data layer to at least one QCL group, the QCL group being an antenna port group established in accordance with a QCL relationship among antenna ports; and performing, by the network side device, data transmission in accordance with the QCL group. According to the present disclosure, it is able to perform the data transmission through multi-array antennae.

15 Claims, 6 Drawing Sheets

(51) Int. Cl.
*H04B 7/06* (2006.01)
*H04L 1/00* (2006.01)
*H04L 5/10* (2006.01)

(52) U.S. Cl.
CPC .......... *H04L 5/0023* (2013.01); *H04L 5/0051* (2013.01); *H04L 5/10* (2013.01)

(56) References Cited

U.S. PATENT DOCUMENTS

| | | |
|---|---|---|
| 2016/0013903 A1 | 1/2016 | Kim et al. |
| 2016/0226538 A1 | 8/2016 | Kim et al. |
| 2016/0248561 A1* | 8/2016 | Davydov ............... H04B 7/024 |

FOREIGN PATENT DOCUMENTS

| | | | |
|---|---|---|---|
| EP | 2999133 A1 * | 3/2016 | ........... H04L 5/0048 |
| WO | 2016122257 A1 | 8/2016 | |
| WO | 2017180049 A1 | 10/2017 | |

OTHER PUBLICATIONS

Written Opinion of the International Searching Authority and International Search Report from PCT/CN2018/075590 dated May 9, 2018, with English translation from WIPO.
International Preliminary Report on Patentability from PCT/CN2018/075590, dated Jul. 16, 2019, with English translation from WIPO.
"Soft Buffer Allocation", R1-081872, 3GPP TSG-RAN Working Group 1 #53, Kansas City, USA, May 5-9, 2008.
Way Forward on downlink control signalling for PDSCH RE mapping and quasi-co-location of CSI-RS and DMRS for TM10, R1-124623, 3GPP TSG RAN WG1 #70bis, San Diego, USA, Oct. 8-12, 2012.
"Potential enhancements and specification impact analysis of non-coherent JT", R1-1608610, 3GPP TSG RAN WG1 Meeting #86bis, Lisbon, Portugal, Oct. 10-14, 2016.
First Office Action and Search Report from CN app. No. 201710016847.2, dated Mar. 4, 2020, with English translation from Global Dossier.

\* cited by examiner

DATA TRANSMISSION CONTROL METHOD, NETWORK SIDE DEVICE AND TERMINAL SIDE DEVICE

CROSS-REFERENCE TO RELATED APPLICATIONS

The present application is the U.S. national phase of PCT Application No. PCT/CN2018/075590 filed on Feb. 7, 2018, which claims a priority of the Chinese patent application 201710016847.2 filed on Jan. 10, 2017, which are incorporated herein by reference in their entireties.

TECHNICAL FIELD

The present disclosure relates to the field of communication technology, in particular to a data transmission control method, a network side device and a terminal side device.

BACKGROUND

In a current Long Term Evolution (LTE) system, during the data transmission, a high-layer transmission block is at first mapped to at most two codewords, then codewords are mapped to a layer through a layer mapping module, and then a signal is mapped to an antenna port through layer-to-port mapping. A conventional data transmission mechanism may support the transmission through at most two codewords and eight data streams, but it is merely adapted to single-array Multiple-Input Multiple-Output (MIMO) transmission. In a massive antenna system, a plurality of independent Adaptive Antenna System (AAS) sub-array modules may probably be adopted, and these AAS sub-array modules may have different clock synchronization and spaced apart from each other at a relatively large distance, so it is impossible to directly adopt the conventional transmission mechanism.

SUMMARY

An object of the present disclosure is to provide a data transmission control method, a network side device and a terminal side device, so as to improve the transmission through multi-array antennae.

In one aspect, the present disclosure provides in some embodiments a data transmission control method, including: mapping, by a network side device, a codeword to at least one data layer; mapping, by the network side device, the at least one data layer to at least one quasi co-location (QCL) group, the QCL group being an antenna port group established in accordance with a QCL relationship among antenna ports; and performing, by the network side device, data transmission in accordance with the QCL group.

In some possible embodiments of the present disclosure, prior to mapping, by the network side device, the codeword to the at least one data layer, the data transmission control method further includes: receiving, by the network side device, an uplink reference signal from a terminal side device; performing, by the network side device, uplink reference signal measurement in accordance with the uplink reference signal; determining, by the network side device, the QCL relationship among the antenna ports in accordance with a measurement result; and dividing, by the network side device, the antenna ports in accordance with the QCL relationship into groups, so as to acquire the at least one QCL group.

In some possible embodiments of the present disclosure, prior to mapping, by the network side device, the codeword to the at least one data layer, the data transmission control method further includes: transmitting, by the network side device, a downlink reference signal to the terminal side device, the downlink reference signal being adopted by the terminal side device to perform downlink reference signal measurement and determine the QCL relationship among the antenna ports of the network side device in accordance with a measurement result; and receiving, by the network side device, a division mode reported by the terminal side device after the antenna ports have been divided into groups in accordance with the QCL relationship.

In some possible embodiments of the present disclosure, in a non-spatial multiplexing state, when data is transmitted in a multi-layered and diversified manner, the mapping, by the network side device, the at least one data layer to the at least one QCL group includes: when the data is transmitted in a coherent mode, mapping, by the network side device, all the data layers to one QCL group; and when the data is transmitted in an incoherent mode, mapping, by the network side device, the data layers corresponding to different data layer subsets to different QCL groups, and mapping the data layers corresponding to a same data layer subset to one or more QCL groups.

In some possible embodiments of the present disclosure, in a closed-loop spatial multiplexing state, the mapping, by the network side device, the at least one data layer to the at least one QCL group includes: when the data is transmitted in a coherent mode, mapping, by the network side device, all the data layers to one QCL group; and when the data is transmitted in an incoherent mode, mapping, by the network side device, data layers corresponding to different data layer subsets to different QCL groups, and mapping the data layers corresponding to a same data layer subset to a same QCL group.

In some possible embodiments of the present disclosure, in an open-loop spatial multiplexing state, the mapping, by the network side device, the at least one data layer to the at least one QCL group includes: when the data is transmitted in a coherent mode, mapping, by the network side device, all the data layers to one QCL group; and when the data is transmitted in an incoherent mode, mapping, by the network side device, all the data layers to at least two QCL groups.

In some possible embodiments of the present disclosure, the mapping, by the network side device, the at least one data layer to the at least one QCL group further includes, when the data is transmitted in an incoherent mode, mapping, by the network side device, different data layers in a same data layer subset to different QCL groups.

In some possible embodiments of the present disclosure, prior to mapping, by the network side device, the at least one data layer to the at least one QCL group, the data transmission control method further includes preconfiguring, by the network side device, a limit value of the quantity of codewords on each QCL group.

In some possible embodiments of the present disclosure, the data transmission includes service data transmission or channel state information (CSI) transmission.

In some possible embodiments of the present disclosure, the data transmission control method further includes, during the service data transmission, transmitting, by the network side device, corresponding control information on each QCL group in accordance with the QCL groups. The control information is adopted to indicate demodulation reference signal (DMRS) port allocation, an S-channel identity (SCID) and resource allocation during the service data transmission.

In some possible embodiments of the present disclosure, in a spatial multiplexing state, when a data layer to which each codeword is mapped is mapped to one QCL group, the data transmission control method further includes, during the service data transmission, notifying, by the network side device, a modulation and coding scheme (MCS) of the codeword, a new data indicator (NDI) and a redundancy version (RV) in each QCL group.

In some possible embodiments of the present disclosure, during the CSI transmission, the performing, by the network side device, the data transmission in accordance with the QCL group includes: transmitting, by the network side device, measurement configuration information to the terminal side device in accordance with the QCL group, the measurement configuration information being adopted by the terminal side device to perform CSI measurement on each antenna port in the QCL group; transmitting, by the network side device, a CSI indication signal on a resource corresponding to each antenna port in each QCL group on a QCL group basis; and receiving, by the network side device, a measurement result reported by the terminal side device after the CSI indication signal has been measured in accordance with the measurement configuration information.

In another aspect, the present disclosure provides in some embodiments a data transmission control method, including: interacting, by a terminal side device, uplink reference signal measurement or downlink reference signal measurement with a network side device, so as to divide antenna ports of the network side device into QCL groups, each QCL group being an antenna port group established in accordance with a QCL relationship among the antenna ports; and performing, by the terminal side device, data transmission in accordance with the QCL groups.

In some possible embodiments of the present disclosure, during the interaction of the downlink reference signal measurement between the terminal side device and the network side device, prior to performing, by the terminal side device, the data transmission in accordance with the QCL groups, the data transmission control method further includes: determining, by the terminal side device, the QCL relationship among the antenna ports of the network side device in accordance with a measurement result; dividing, by the terminal side device, the antenna ports into groups in accordance with the QCL relationship, so as to acquire at least one QCL groups; and reporting, by the terminal side device, a division mode corresponding to the at least one QCL group.

In some possible embodiments of the present disclosure, the data transmission includes service data transmission or CSI transmission.

In some possible embodiments of the present disclosure, during the CSI transmission, the data transmission control method further includes: receiving, by the terminal side device, measurement configuration information from the network side device; performing, by the terminal side device, CSI measurement on the antenna ports in the QCL group in accordance with the measurement configuration information; calculating, by the terminal side device, CSI about a to-be-measured channel in the measurement configuration information in accordance with a coherent transmission mode or incoherent transmission mode; and reporting, by the terminal side device, the calculated CSI to the network side device.

In some possible embodiments of the present disclosure, when the terminal side device calculates the CSI about the to-be-measured channel in the measurement configuration information in accordance with the coherent transmission mode, the reporting, by the terminal side device, the calculated CSI to the network side device includes reporting CSI corresponding to one or more QCL groups to the network side device. When the terminal side device calculates the CSI about the to-be-measured channel in the measurement configuration information in accordance with the incoherent transmission mode, the reporting, by the terminal side device, the calculated CSI to the network side device includes reporting CSI corresponding to a combination of one or more QCL groups to the network side device.

In yet another aspect, the present disclosure provides in some embodiments a network side device, including: a codeword mapping module configured to map a codeword to at least one data layer; a group mapping module configured to map the at least one data layer to at least one QCL group, the QCL group being an antenna port group established in accordance with a QCL relationship among antenna ports; and a first transmission module configured to perform data transmission in accordance with the QCL group.

In some possible embodiments of the present disclosure, the network side device further includes: a first reception module configured to receive an uplink reference signal from a terminal side device; a first measurement module configured to perform uplink reference signal measurement in accordance with the uplink reference signal; a first determination module configured to determine the QCL relationship among the antenna ports in accordance with a measurement result; and a first division module configured to divide the antenna ports in accordance with the QCL relationship into groups, so as to acquire the at least one QCL group.

In some possible embodiments of the present disclosure, the network side device further includes: a transmission module configured to transmit a downlink reference signal to the terminal side device, the downlink reference signal being adopted by the terminal side device to perform downlink reference signal measurement and determine the QCL relationship among the antenna ports of the network side device in accordance with a measurement result; and a second reception module configured to receive a division mode reported by the terminal side device after the antenna ports have been divided into groups in accordance with the QCL relationship.

In some possible embodiments of the present disclosure, in a non-spatial multiplexing state, when data is transmitted in a multi-layered and diversified manner, the group mapping module is further configured to: when the data is transmitted in a coherent mode, map all the data layers to one QCL group; and when the data is transmitted in an incoherent mode, map the data layers corresponding to different data layer subsets to different QCL groups, and map the data layers corresponding to a same data layer subset to one or more QCL groups.

In some possible embodiments of the present disclosure, in a closed-loop spatial multiplexing state, the group mapping module is further configured to: when the data is transmitted in a coherent mode, map all the data layers to one QCL group; and when the data is transmitted in an incoherent mode, map data layers corresponding to different data layer subsets to different QCL groups, and map the data layers corresponding to a same data layer subset to a same QCL group.

In some possible embodiments of the present disclosure, in an open-loop spatial multiplexing state, the group mapping module is further configured to: when the data is transmitted in a coherent mode, map all the data layers to one QCL group; and when the data is transmitted in an incoherent mode, map all the data layers to at least two QCL groups.

In some possible embodiments of the present disclosure, in the open-loop spatial multiplexing state, the group mapping module is further configured to, when the data is transmitted in an incoherent mode, map different data layers in a same data layer subset to different QCL groups.

In some possible embodiments of the present disclosure, the network side device further includes a codeword limitation module configured to preconfigure a limit value of the quantity of codewords on each QCL group.

In some possible embodiments of the present disclosure, the data transmission includes service data transmission or CSI transmission.

In some possible embodiments of the present disclosure, the first transmission module is further configured to, dicing the service data transmission, transmit corresponding control information on each QCL group in accordance with the QCL groups. The control information is adopted to indicate DMRS port allocation, an SCID and resource allocation during the service data transmission.

In some possible embodiments of the present disclosure, in a spatial multiplexing state, when a data layer to which each codeword is mapped is mapped to one QCL group, the first transmission module is further configured to, during the service data transmission, notify a modulation and coding scheme (MCS) of the codeword, an NDI and an RV in each QCL group.

In some possible embodiments of the present disclosure, during the CSI transmission, the first transmission module includes: a first transmission unit configured to transmit measurement configuration information to the terminal side device in accordance with the QCL group, the measurement configuration information being adopted by the terminal side device to perform CSI measurement on each antenna port in the QCL group; a second transmission unit configured to transmit a CSI indication signal on a resource corresponding to each antenna port in each QCL group on a QCL group basis; and a reception unit configured to receive a measurement result reported by the terminal side device after the CSI indication signal has been measured in accordance with the measurement configuration information.

In still yet another aspect, the present disclosure provides in some embodiments a terminal side device, including: a reference signal interaction module configured to interact uplink reference signal measurement or downlink reference signal measurement with a network side device, so as to divide antenna ports of the network side device into QCL groups, each QCL group being an antenna port group established in accordance with a QCL relationship among the antenna ports; and a second transmission module configured to perform data transmission in accordance with the QCL groups.

In some possible embodiments of the present disclosure, during the interaction of the downlink reference signal measurement between the reference signal interaction module and the network side device, the terminal side device further includes: a second determination module configured to determine the QCL relationship among the antenna ports of the network side device in accordance with a measurement result; a second division module configured to divide the antenna ports into groups in accordance with the QCL relationship, so as to acquire at least one QCL groups; and a first reporting module configured to report a division mode corresponding to the at least one QCL group.

In some possible embodiments of the present disclosure, the data transmission includes service data transmission or CSI transmission.

In some possible embodiments of the present disclosure, during the CSI transmission, the terminal side device further includes: a third reception module configured to receive measurement configuration information from the network side device; a second measurement module configured to perform CSI measurement on the antenna ports in the QCL group in accordance with the measurement configuration information; a calculation module configured to calculate CSI about a to-be-measured channel in the measurement configuration information in accordance with a coherent transmission mode or incoherent transmission mode; and a second reporting module configured to report the calculated CSI to the network side device.

In some possible embodiments of the present disclosure, when the calculation module calculates the CSI about the to-be-measured channel in the measurement configuration information in accordance with the coherent transmission mode, the second reporting module is further configured to report CSI corresponding to one or more QCL groups to the network side device. When the calculation module calculates the CSI about the to-be-measured channel in the measurement configuration information in accordance with the incoherent transmission mode, the second reporting module is further configured to report CSI corresponding to a combination of one or more QCL groups to the network side device.

In still yet another aspect, the present disclosure provides in some embodiments a network side device, including a processor, a memory, and a computer program stored in the memory and executed by the processor. The computer program is executed by the processor, so as to implement the above-mentioned data transmission control method.

In still yet another aspect, the present disclosure provides in some embodiments a terminal side device, including a processor, a memory, and a computer program stored in the memory and executed by the processor. The computer program is executed by the processor, so as to implement the above-mentioned data transmission control method.

In still yet another aspect, the present disclosure provides in some embodiments a computer-readable storage medium storing therein a computer program. The computer program is executed by a processor so as to implement the above-mentioned data transmission control method.

In still yet another aspect, the present disclosure provides in some embodiments a computer-readable storage medium storing therein a computer program. The computer program is executed by a processor so as to implement the above-mentioned data transmission control method.

According to the embodiments of the present disclosure, the network side device may map the codeword to the at least one data layer, and map the at least one data layer to the at least one QCL group, and the QCL group may be an antenna port group established in accordance with the QCL relationship among the antenna ports. Then, the network side device may perform the data transmission in accordance with the QCL group. As a result, it is able to perform the data transmission through multi-array antennae in a better manner.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
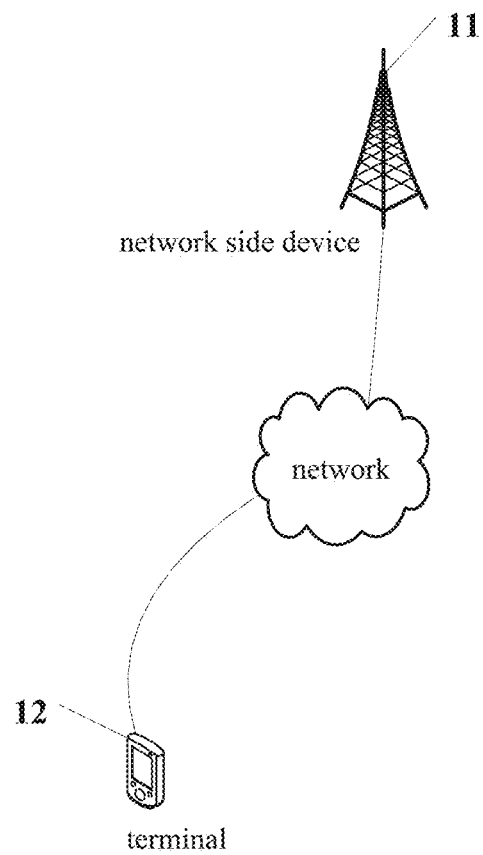
FIG. 1 is a schematic view showing an applicable network according to some embodiments of the present disclosure.

FIG. 1 shows a network to which the scheme in the embodiments of the present disclosure is applicable. As shown in FIG. 1, the network includes a network side device 11 and a terminal side device 12. The network side device 11 may be an evolved Node B (eNB) or any other base station. It should be appreciated that, the type of the network side device 11 will not be particularly defined herein. The network side device 11 may communicate, e.g., in a wireless manner as shown in FIG. 1, with the terminal side device 12. The terminal side device 12 may be a mobile phone, a tablet personal computer, a laptop computer, a personal digital assistant (PDA), a mobile Internet device (MID) or a wearable device. It should be appreciated that, the type of the terminal side device 12 is not limited herein.

Figure 2:
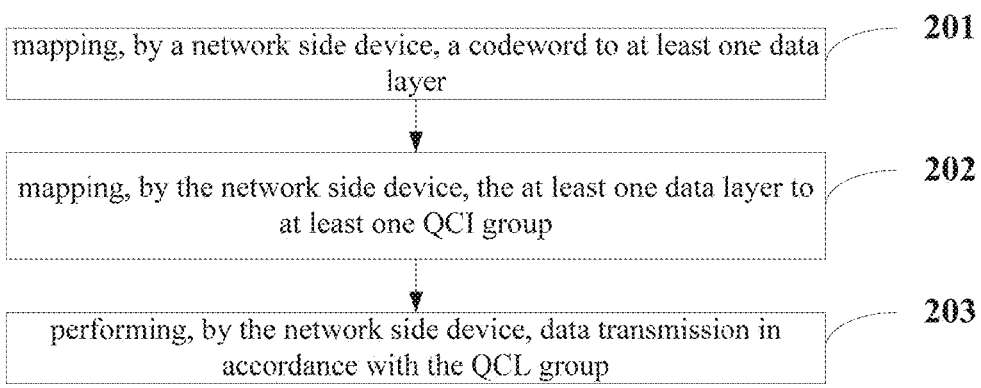
FIG. 2 is a flow chart of a data transmission control method according to some embodiments of the present disclosure.

Based on the network in FIG. 1, the present disclosure provides in some embodiments a data transmission control method which, as shown in FIG. 2, includes: Step 201 of mapping, by a network side device, a codeword to at least one data layer; Step 202 of mapping, by the network side device, the at least one data layer to at least one QCI group, the QCL group being an antenna port group established in accordance with a QCL relationship among antenna ports; and Step 203 of performing, by the network side device, data transmission in accordance with the QCL group.

Table 1 illustratively shows how to map the codeword to the at least one data layer in Step 201, i.e., codeword-to-layer mapping for spatial multiplexing, where x represents the layer, and d represents the codeword.

TABLE 1

| Quantity of layers | Quantity of codewords | Codeword-to-layer mapping $l = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ | $M_{symb}^{layer} = M_{symb}^{(0)}/2$ |
|   |   | $x^{(1)}(i) = d^{(0)}(2i + 1)$ | |
| 3 | 1 | $x^{(0)}(i) = d^{(0)}(3i)$ | $M_{symb}^{layer} = M_{symb}^{(0)}/3$ |
|   |   | $x^{(1)}(i) = d^{(0)}(3i + 1)$ | |
|   |   | $x^{(2)}(i) = d^{(0)}(3i + 2)$ | |
| 4 | 1 | $x^{(0)}(i) = d^{(0)}(4i)$ | $M_{symb}^{layer} = M_{symb}^{(0)}/4$ |
|   |   | $x^{(1)}(i) = d^{(0)}(4i + 1)$ | |
|   |   | $x^{(2)}(i) = d^{(0)}(4i + 2)$ | |
|   |   | $x^{(3)}(i) = d^{(0)}(4i + 3)$ | |
| 5 | 2 | $x^{(0)}(i) = d^{(0)}(2i)$ | $M_{symb}^{layer} = M_{symb}^{(0)}/2 = M_{symb}^{(1)}/3$ |
|   |   | $x^{(1)}(i) = d^{(0)}(2i + 1)$ | |
|   |   | $x^{(2)}(i) = d^{(1)}(3i)$ | |
|   |   | $x^{(3)}(i) = d^{(1)}(3i + 1)$ | |
|   |   | $x^{(4)}(i) = d^{(1)}(3i + 2)$ | |
| 6 | 2 | $x^{(0)}(i) = d^{(0)}(3i)$ | $M_{symb}^{layer} = M_{symb}^{(0)}/3 = M_{symb}^{(1)}/3$ |
|   |   | $x^{(1)}(i) = d^{(0)}(3i + 1)$ | |
|   |   | $x^{(2)}(i) = d^{(0)}(3i + 2)$ | |
|   |   | $x^{(3)}(i) = d^{(1)}(3i)$ | |
|   |   | $x^{(4)}(i) = d^{(1)}(3i + 1)$ | |
|   |   | $x^{(5)}(i) = d^{(1)}(3i + 2)$ | |
| 7 | 2 | $x^{(0)}(i) = d^{(0)}(3i)$ | $M_{symb}^{layer} = M_{symb}^{(0)}/3 = M_{symb}^{(1)}/4$ |
|   |   | $x^{(1)}(i) = d^{(0)}(3i + 1)$ | |
|   |   | $x^{(2)}(i) = d^{(0)}(3i + 2)$ | |
|   |   | $x^{(3)}(i) = d^{(1)}(4i)$ | |
|   |   | $x^{(4)}(i) = d^{(1)}(4i + 1)$ | |
|   |   | $x^{(5)}(i) = d^{(1)}(4i + 2)$ | |
|   |   | $x^{(6)}(i) = d^{(1)}(4i + 3)$ | |
| 8 | 2 | $x^{(0)}(i) = d^{(0)}(4i)$ | $M_{symb}^{layer} = M_{symb}^{(0)}/4 = M_{symb}^{(1)}/4$ |
|   |   | $x^{(1)}(i) = d^{(0)}(4i + 1)$ | |

TABLE 1-continued

| Quantity of layers | Quantity of codewords | Codeword-to-layer mapping $l = 0, 1, \ldots, M_{symb}^{layer} - 1$ |
|---|---|---|
| | | $x^{(2)}(i) = d^{(0)}(4i + 2)$ |
| | | $x^{(3)}(i) = d^{(0)}(4i + 3)$ |
| | | $x^{(4)}(i) = d^{(1)}(4i)$ |
| | | $x^{(5)}(i) = d^{(1)}(4i + 1)$ |
| | | $x^{(6)}(i) = d^{(1)}(4i + 2)$ |
| | | $x^{(7)}(i) = d^{(1)}(4i + 3)$ |

Layer-to-QCL group mapping in Step 202, i.e., the mapping of the layer to a corresponding antenna port (or reference signal port) in the QCL group, will be described hereinafter illustratively.

For example, a procedure of mapping v layers to v antenna ports may be expressed as $$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix}.$$

At this time, there may exist one or more codewords. Each codeword may be mapped to one or more data layers. A specific mapping mode may be set in accordance with the requirement on the data transmission, and thus will not be particularly defined herein. For example, when a single-layer transmission scheme is adopted, one codeword may be mapped to one data layer, i.e., a one-to-one mapping relationship may be adopted. When a transmission diversity mode is adopted, one codeword may be mapped to two or more data layers. When a space-frequency block coding (SFBC) scheme is adopted, one codeword may be mapped to two data layers, and when the SFBC scheme and a Frequency Switch Transmission Diversity (FSTD) scheme are adopted, one codeword may be mapped to four data layers.

The mapping relationship between the data layers and the QCL groups may be set according to the practical need. For example, the mapping relationships may differ with respect to different transmission modes. A same data layer may be mapped to one QCL group or at least two QCL groups. In addition, the quantity of the data layers in each QCL group or the quantity of the codewords corresponding to the data layer may be limited. Detailed description will be given as follows.

In a first circumstance, in a non-spatial multiplexing state, when data is transmitted in a single-layered manner, Step 202 may include mapping, by the network side device, the at least one data layer to one or more QCL groups.

In the first circumstance, the data for the at least one data layer may be transmitted through one or more QCL groups in accordance with the practical need, which will not be particularly defined herein.

In a second circumstance, in the non-spatial multiplexing state, when the data is transmitted in a multi-layered, diversified manner, Step 202 may include: when the data is transmitted in a coherent mode, mapping, by the network side device, all the data layers to one QCL group; and when the data is transmitted in an incoherent mode, mapping, by the network side device, the data layers corresponding to different data layer subsets to different QCL groups, and mapping the data layers corresponding to a same data layer subset to one or more QCL groups.

In the second circumstance, when the data is transmitted in the incoherent mode, the network side device may configure the QCL groups for all the data layer subsets, and map different data layer subsets to different QCL groups. The same data layer substrate may be mapped to one or more QCL groups according to the practical need. For example, a data layer subset A may include a data layer A1 and a data layer A2, a data layer subset B may include a data layer B1 and a data layer B2, and the QCL groups may include a QCL group 1, a QCL group 2, a QCL group 3 and a QCL group 4. At this time, the data layers A1 and A2 in the data layer subset A may be mapped to the QCL group 1 simultaneously, the data layer B1 may be mapped to the QCL group 2, and the data layer B2 may be mapped to the QCL group 3. It should be appreciated that, in the embodiments of the present disclosure, the same data layer may also be mapped to a plurality of QCL groups, e.g., the data layer B2 may be mapped to the QCL group 3 and the QCL group 4.

In a third circumstance, in a closed-loop spatial multiplexing state, Step 202 may include: when the data is transmitted in a coherent mode, mapping, by the network side device, all the data layers to one QCL group; and when the data is transmitted in an incoherent mode, mapping, by the network side device, data layers corresponding to different data layer subsets to different QCL groups, and mapping the data layers corresponding to a same data layer subset to a same QCL group.

In the third circumstance, when the data is transmitted in the incoherent mode, the network side device may configure the QCL groups for all the data layer subsets, and map different data layer subsets to different QCL groups. A data layer corresponding to the same data layer subset may be mapped to the same QCL group according to the practical need. For example, data layers to which a first codeword is mapped may include a data layer A1, a data layer A2 and a data layer A3, and data layers to which a second codeword is mapped may include a data layer B1, a data layer B2 and a data layer B3. The data layers A1 and A2 may form a first data layer subset, the data layer A3 may form a second data layer subset, the data layers B1 and B2 may form a third data layer subset, and the data layer B3 may form a fourth data layer subset. The QCL groups may include a QCL group 1, a QCL group 2, a QCL group 3 and a QCL group 4. At this time, the data layers A1 and A2 in the data layer subset A may be mapped to the QCL group 1 simultaneously, the data layer A3 may be mapped to the QCL group 2, the data layers B1 and B2 may be mapped to the QCL group 3, and the data layer B3 may be mapped to the QCL group 4.

In a fourth circumstance, in an open-loop spatial multiplexing state, Step 202 may include: when the data is transmitted in a coherent mode, mapping, by the network side device, all the data layers to one QCL group: and when the data is transmitted in an incoherent mode, mapping, by the network side device, all the data layers to at least two QCL groups.

In the fourth circumstance, different data layers in the same data layer subset may be mapped to different QCL groups or the same QCL group according to the practical need. For example, in the fourth circumstance, Step 202 may further include mapping, by the network side device, different data layers in a same data layer subset to different QCL groups.

In the third and fourth circumstances, a limit value of the quantity of the codewords may be set in each QCL group, and the mapping relationship between the data layers and the QCL groups may be set in accordance with the limit value of the quantity of the codewords. To be specific, prior to Step 202, the data transmission control method may further include preconfiguring, by the network side device, the limit value of the quantity of the codewords on each QCL group.

It should be appreciated that, when the network side device maps all the data layers to one QCL group, the data transmission may be switched within different transmission time slots. For example, the QCL groups may be switched within different transmission time slots, or different antenna resources of the same QCL group may be switched within different transmission time slots. For example, the data transmission may be performed through the QCL group 1 within a first transmission time slot, and the data transmission may be performed through the QCL group 2 within a second transmission time slot. For another example, the data transmission may be performed through antenna ports No. 1 to No. 5 in the QCL group within the first transmission time slot, and the data transmission may be performed through antenna ports No. 6 to No. 10 in the QCL group within the second transmission time slot. It should be further appreciated that, a switching mode of the data transmission may be set according to the practical need, and thus will not be particularly defined herein.

To be specific, parameter values corresponding to large-scale parameters of channels experienced by signals transmitted through the antenna ports of the same QCL group may be within a same predetermined range. The large-scale parameters may include at least one of average gain, average delay, delay spread, average arrival angle, and arrival angle spread.

In the embodiments of the present disclosure, for the channels experienced by the signals transmitted through the antenna ports having the QCL relationship, their large-scale parameters may be considered as being substantially consistent with each other. In other words, in terms of the large-scale channel parameters, these antenna ports may be considered as being at a same position. Hence, hypothesis may be performed on the QCLs with respect to the antenna ports which have been considered to be at the same position, so that the antenna ports belong to the same QCL group. In addition, no hypothesis may be performed on the QCLs with respect to the antenna ports in different QCL groups.

In some possible embodiments of the present disclosure, a division mode for the QCL groups may be set according to the practical need. For example, antenna ports of a base station may be divided by the terminal side device, or by the base station itself, into the QCL groups, which will be described hereinafter in more details.

Figure 3:
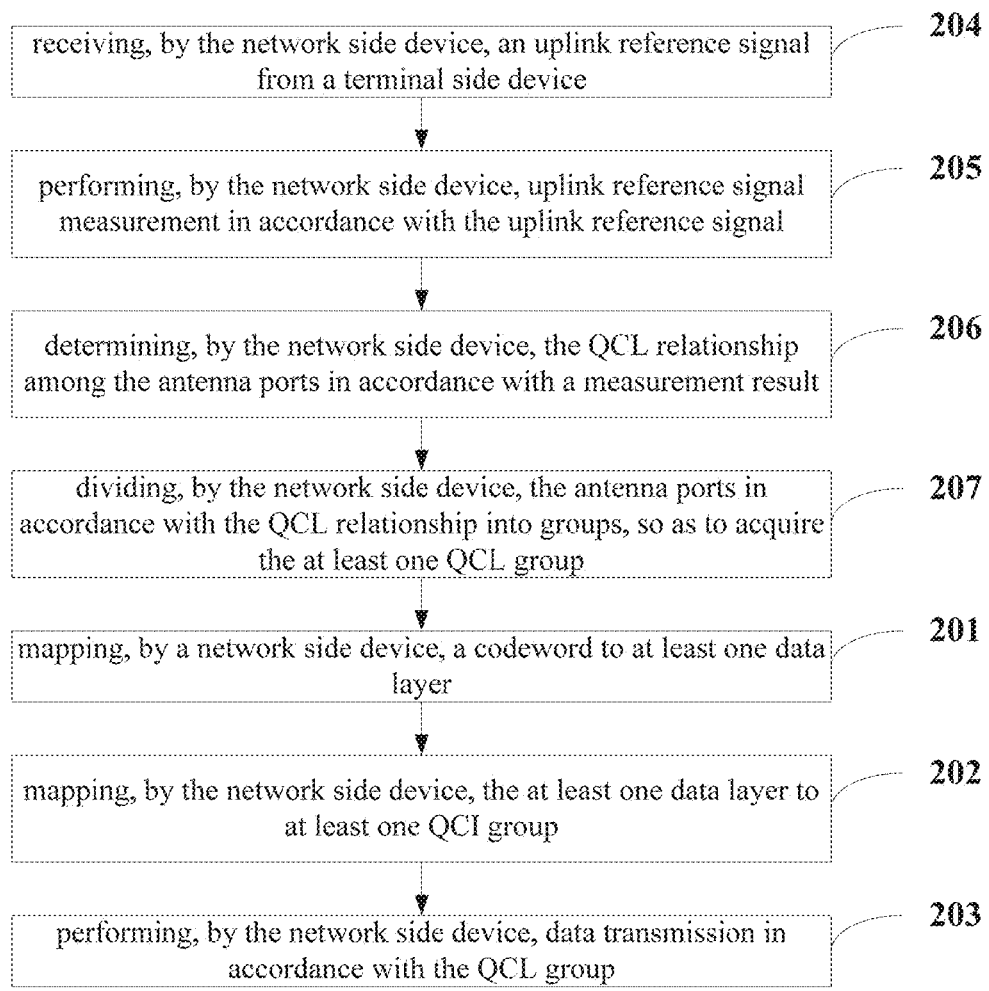
FIG. 3 is another flow chart of the data transmission control method according to some embodiments of the present disclosure.

As shown in FIG. 3, prior to Step 201, the data transmission control method may further include: Steps 204 of receiving, by the network side device, an uplink reference signal from a terminal side device; Step 205 of performing, by the network side device, uplink reference signal measurement in accordance with the uplink reference signal; Step 206 of determining, by the network side device, the QCL relationship among the antenna ports in accordance with a measurement result; and Step 207 of dividing, by the network side device, the antenna ports in accordance with the QCL relationship into groups, so as to acquire the at least one QCL group.

In the embodiments of the present disclosure, the antenna ports may be divided into the QCL groups in accordance with the measurement result acquired when the network side device perform the measurement on the uplink reference signal from the network side device. For example, the terminal side device may transmit the uplink reference signal, and upon the receipt of the uplink reference signal, the network side device may perform measurement configuration, so as to measure beams for the terminal side device. The network side device may determine the relationship among its own antenna ports in accordance with the measurement result, so as to divide the antenna ports into at least one QCL group. The uplink reference signal may be transmitted by the terminal side device initiatively to the network side device, so as to facilitate the measurement performed by the network side device. In addition, the network side device may transmit corresponding control signaling to the terminal side device, so as to trigger the terminal side device to transmit the uplink reference signal to the network side device, thereby to facilitate the measurement performed by the network side device.

Figure 4:
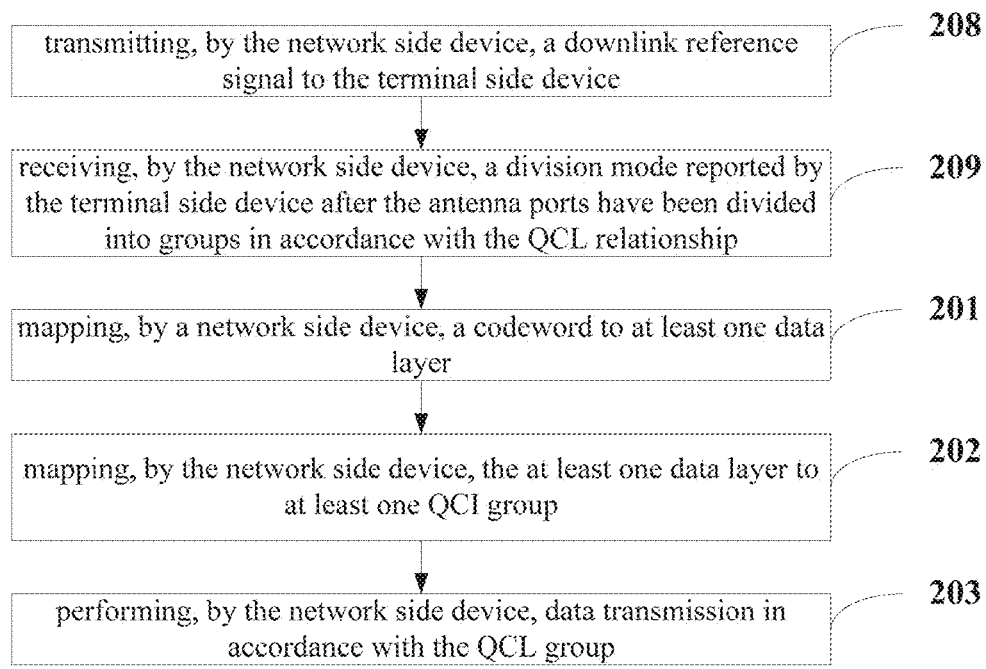
FIG. 4 is yet another flow chart of the data transmission control method according to some embodiments of the present disclosure.

In some possible embodiments of the present disclosure, as shown in FIG. 4, prior to Step 201, the data transmission control method may further include: Step 208 of transmitting, by the network side device, a downlink reference signal to the terminal side device, the downlink reference signal being adopted by the terminal side device to perform downlink reference signal measurement and determine the QCL relationship among the antenna ports of the network side device in accordance with a measurement result; and Step 209 of receiving, by the network side device, a division mode reported by the terminal side device after the antenna ports have been divided into groups in accordance with the QCL relationship.

In the embodiments of the present disclosure, the terminal side device may measure the downlink reference signal, and the hypothesis may be performed on the QCL relationship among the antenna ports of the network side device in accordance with the measurement result, so as to divide the antenna ports in to the QCL groups. For example, the hypothesis may be performed on the QCLs among the antenna ports in each QCL group, and no hypothesis may be performed on the QCLs among the antenna ports in different QCL groups. Finally, the division mode for the QCL groups may be reported to the network side device, and the network side device may establish the QCL relationship among the antenna ports.

In some possible embodiments of the present disclosure, the data transmission may include service data transmission or CSI transmission.

In some possible embodiments of the present disclosure, during the service data transmission, the network side device may transmit corresponding control information on each QCL group in accordance with the QCL groups. The control information may be adopted to indicate DMRS port allocation, an SCID and resource allocation during the service data transmission.

To be specific, in a spatial multiplexing state, when a data layer to which each codeword is mapped is mapped to one QCL group, the data transmission control method may further include, during the service data transmission, notifying, by the network side device, an MCS of the codeword, an NDI and an RV in each QCL group. It should be appreciated that, in some other embodiments of the present disclosure, information notified in each QCL group may further include any other data information, which will not be particularly defined herein.

In some possible embodiments of the present disclosure, during the CSI transmission, Step 203 may include: transmitting, by the network side device, measurement configuration information to the terminal side device in accordance with the QCL group, the measurement configuration information being adopted by the terminal side device to perform CSI measurement on each antenna port in the QCL group; transmitting, by the network side device, a CSI indication signal on a resource corresponding to each antenna port in each QCL group on a QCL group basis; and receiving, by the network side device, a measurement result reported by the terminal side device after the CSI indication signal has been measured in accordance with the measurement configuration information.

In the embodiments of the present disclosure, due to the difference between the coherent transmission mode and the incoherent transmission mode, the CSI indication signals transmitted on each QCL group may be different from each other. For example, in the coherent transmission mode, different CSI indication signals may be transmitted on different QCL groups, and in the incoherent transmission mode, the CSI indication signal may be transmitted on a combination of at least one QCL group. For example, different CSI indication signals may be transmitted on different combinations of the QCL groups.

The terminal side device may perform the CSI measurement in accordance with the measurement configuration information from the network side device, and report the measurement result to the network side device. Due to different transmission modes, the measurement result may be reported in different ways.

For example, when the terminal side device calculates the CSI for the to-be-measured channel in the measurement configuration information on the basis of the coherent transmission mode, the terminal side device may report the CSI corresponding to one or more QCL groups to the network side device. When the terminal side device calculates the CSI for the to-be-measured channel in the measurement configuration information on the basis of the incoherent transmission mode, the terminal side device may report the CSI corresponding to a combination of one or more QCL groups to the network side device.

In the embodiments of the present disclosure, the CSI may include channel quality information and a recommended transmission parameter. The recommended transmission parameter may include a Precoding Matrix Indicator (PMI) and a Rank Indicator (RI).

According to the embodiments of the present disclosure, the network side device may map the codeword to the at least one data layer, and map the at least one data layer to at least one QCL group, and the QCL group may be the antenna port group established in accordance with the QCL relationship among the antenna ports. Then, the network side device may perform the data transmission in accordance with the QCL group. As a result, it is able to perform the data transmission through the multi-array antennae in a better manner.

Figure 5:
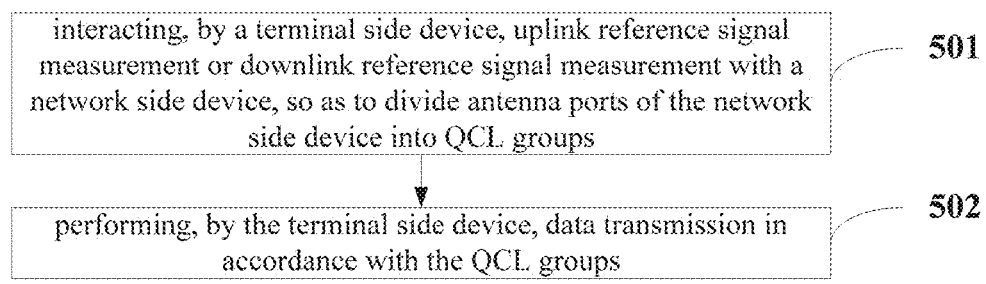
FIG. 5 is a flow chart of a data transmission control method according to some embodiments of the present disclosure.

Based on the network in FIG. 1, the present disclosure further provides in some embodiments a data transmission control method which, as shown in FIG. 5, includes: Step 501 of interacting, by a terminal side device, uplink reference signal measurement or downlink reference signal measurement with a network side device, so as to divide antenna ports of the network side device into QCL groups, each QCL group being an antenna port group established in accordance with a QCL relationship among the antenna ports; and Step 502 of performing, by the terminal side device, data transmission in accordance with the QCL groups.

In the embodiments of the present disclosure, during the data transmission, the network side device may map the codeword to the at least one data layer, map the at least one data layer to the at least one QCL group, and then perform the data transmission in accordance with the QCL group.

To be specific, parameter values corresponding to large-scale parameters of channels experienced by signals transmitted through the antenna ports of the same QCL group may be within a same predetermined range. The large-scale parameters may include at least one of average gain, average delay, delay spread, average arrival angle, and arrival angle spread.

In the embodiments of the present disclosure, for the channels experienced by the signals transmitted through the antenna ports having the QCL relationship, their large-scale parameters may be considered as being substantially consistent with each other. In other words, in terms of the large-scale channel parameters, these antenna ports may be considered as being at a same position. Hence, hypothesis may be performed on the QCLs with respect to the antenna ports which have been considered to be at the same position, so that the antenna ports belong to the same QCL group. In addition, no hypothesis may be performed on the QCLs with respect to the antenna ports in different QCL groups.

In some possible embodiments of the present disclosure, a division mode for the QCL groups may be set according to the practical need. For example, antenna ports of a base station may be divided by the terminal side device, or by the base station itself, into the QCL groups, which will be described hereinafter in more details.

Figure 6:
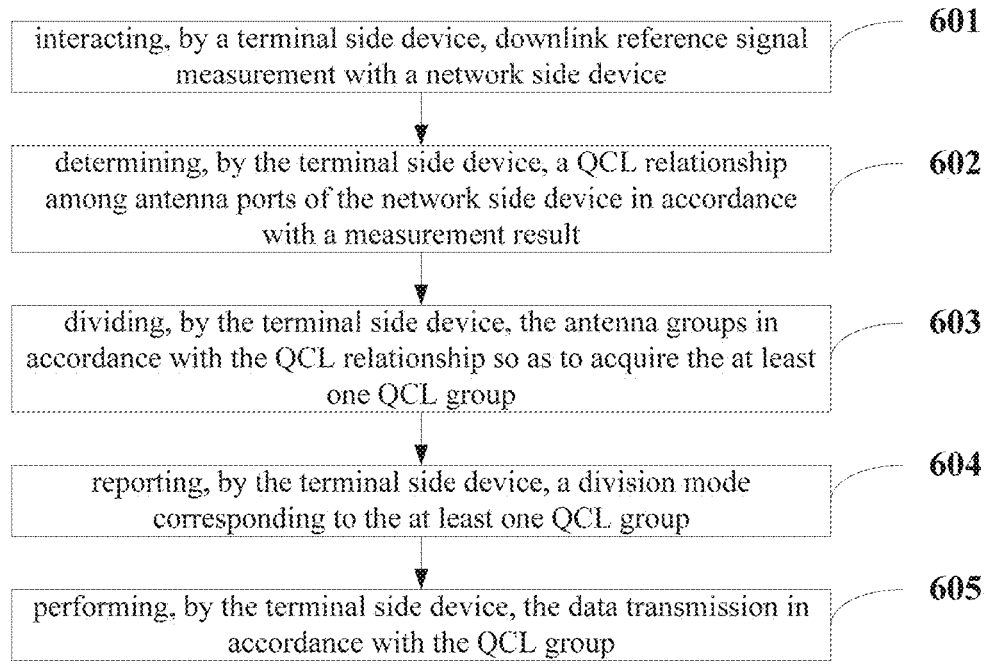
FIG. 6 is another flow chart of the data transmission control method according to some embodiments of the present disclosure.

As shown in FIG. 6, in some possible embodiments of the present disclosure, the data transmission control method may include: Step 601 of interacting, by the terminal side device, the downlink reference signal measurement with the network side device; Step 602 of determining, by the terminal side device, the QCL relationship among the antenna ports of the network side device in accordance with the measurement result; Step 603 of dividing, by the terminal side device, the antenna groups in accordance with the QCL relationship so as to acquire the at least one QCL group; Step 604 of reporting, by the terminal side device, a division mode corresponding to the at least one QCL group; and Step 605 of performing, by the terminal side device, the data transmission in accordance with the QCL group.

In the embodiments of the present disclosure, the terminal side device may measure the downlink reference signal, and the hypothesis may be performed on the QCL relationship among the antenna ports of the network side device in accordance with the measurement result, so as to divide the antenna ports in to the QCL groups. For example, the hypothesis may be performed on the QCLs among the antenna ports in each QCL group, and no hypothesis may be performed on the QCLs among the antenna ports in different QCL groups. Finally, the division mode for the QCL groups may be reported to the network side device, and the network side device may establish the QCL relationship among the antenna ports.

In some possible embodiments of the present disclosure, the data transmission may include service data transmission or CSI transmission.

In some possible embodiments of the present disclosure, during the CSI transmission, the data transmission control method may further include: receiving, by the terminal side device, measurement configuration information from the network side device; performing, by the terminal side device, CSI measurement on the antenna ports in the QCL group in accordance with the measurement configuration information; calculating, by the terminal side device, CSI about a to-be-measured channel in the measurement configuration information in accordance with a coherent transmission mode or incoherent transmission mode; and reporting, by the terminal side device, the calculated CSI to the network side device.

In the embodiments of the present disclosure, due to the difference between the coherent transmission mode and the incoherent transmission mode, the CSI indication signals transmitted on each QCL group may be different from each other. For example, in the coherent transmission mode, different CSI indication signals may be transmitted on different QCL groups, and in the incoherent transmission mode, the CSI indication signal may be transmitted on a combination of at least one QCL group. For example, different CSI indication signals may be transmitted on different combinations of the QCL groups.

The terminal side device may perform the CSI measurement in accordance with the measurement configuration information from the network side device, and report the measurement result to the network side device. Due to different transmission modes, the measurement result may be reported in different ways.

For example, when the terminal side device calculates the CSI for the to-be-measured channel in the measurement configuration information on the basis of the coherent transmission mode, the reporting, by the terminal side device, the calculated CSI to the network side device may include reporting the CSI corresponding to one or more QCL groups to the network side device. When the terminal side device calculates the CSI for the to-be-measured channel in the measurement configuration information on the basis of the incoherent transmission mode, the reporting, by the terminal side device, the calculated CSI to the network side device may include reporting the CSI corresponding to a combination of one or more QCL groups to the network side device.

In the embodiments of the present disclosure, the CSI may include channel quality information and a recommended transmission parameter. The recommended transmission parameter may include a PMI and an RI.

According to the embodiments of the present disclosure, the terminal side device may interact the uplink reference signal measurement or downlink reference signal measurement with the network side device, so as to divide the antenna ports of the network side device into the QCL groups. Each QCL group may be the antenna port group established in accordance with the QCL relationship among the antenna ports. Then, the terminal side device may perform the data transmission in accordance with the QCL groups. As a result, it is able to perform the data transmission through the multi-array antennae in a better manner.

Figure 7:
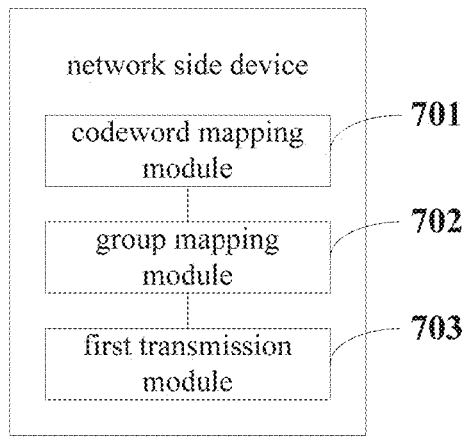
FIG. 7 is a schematic view showing a network side device according to some embodiments of the present disclosure.

The present disclosure further provides in some embodiments a network side device which, as shown in FIG. 7, includes: a codeword mapping module 701 configured to map a codeword to at least one data layer; a group mapping module 702 configured to map the at least one data layer to at least one QCL group, the QCL group being an antenna port group established in accordance with a QCL relationship among antenna ports; and a first transmission module 703 configured to perform data transmission in accordance with the QCL group.

In some possible embodiments of the present disclosure, the network side device may further include: a first reception module configured to receive an uplink reference signal from a terminal side device; a first measurement module configured to perform uplink reference signal measurement in accordance with the uplink reference signal; a first determination module configured to determine the QCL relationship among the antenna ports in accordance with a measurement result; and a first division module configured to divide the antenna ports in accordance with the QCL relationship into groups, so as to acquire the at least one QCL group.

In some possible embodiments of the present disclosure, the network side device may further include: a transmission module configured to transmit a downlink reference signal to the terminal side device, the downlink reference signal being adopted by the terminal side device to perform downlink reference signal measurement and determine the QCL relationship among the antenna ports of the network side device in accordance with a measurement result; and a second reception module configured to receive a division mode reported by the terminal side device after the antenna ports have been divided into groups in accordance with the QCL relationship.

In some possible embodiments of the present disclosure, in a non-spatial multiplexing state, when data is transmitted in a single-layered manner, the group mapping module 702 is further configured to map the at least one data layer to one or more QCL groups.

In some possible embodiments of the present disclosure, in a non-spatial multiplexing state, when data is transmitted in a multi-layered and diversified manner, the group mapping module 702 is further configured to: when the data is transmitted in a coherent mode, map all the data layers to one QCL group; and when the data is transmitted in an incoherent mode, map the data layers corresponding to different data layer subsets to different QCL groups, and map the data layers corresponding to a same data layer subset to one or more QCL groups.

In some possible embodiments of the present disclosure, in a closed-loop spatial multiplexing state, the group mapping module 702 is further configured to: when the data is transmitted in a coherent mode, map all the data layers to one QCL group; and when the data is transmitted in an incoherent mode, map data layers corresponding to different data layer subsets to different QCL groups, and map the data layers corresponding to a same data layer subset to a same QCL group.

In some possible embodiments of the present disclosure, in an open-loop spatial multiplexing state, the group mapping module 702 is further configured to: when the data is transmitted in a coherent mode, map all the data layers to one QCL group; and when the data is transmitted in an incoherent mode, map all the data layers to at least two QCL groups.

In some possible embodiments of the present disclosure, in the open-loop spatial multiplexing state, the group mapping module 702 is further configured to, when the data is transmitted in an incoherent mode, map different data layers in a same data layer subset to different QCL groups.

In some possible embodiments of the present disclosure, the network side device may further include a codeword limitation module configured to preconfigure a limit value of the quantity of codewords on each QCL group.

In some possible embodiments of the present disclosure, the data transmission may include service data transmission or CSI transmission.

In some possible embodiments of the present disclosure, the first transmission module is further configured to, during the service data transmission, transmit corresponding control information on each QCL group in accordance with the QCL groups. The control information may be adopted to indicate DMRS port allocation, an SCID and resource allocation during the service data transmission.

In some possible embodiments of the present disclosure, in a spatial multiplexing state, when a data layer to which each codeword is mapped is mapped to one QCL group, the first transmission module 703 is further configured to, during the service data transmission, notify an MCS of the codeword, an NDI and an RV in each QCL group.

In some possible embodiments of the present disclosure, during the CSI transmission, the first transmission module 703 may include: a first transmission unit configured to transmit measurement configuration information to the terminal side device in accordance with the QCL group, the measurement configuration information being adopted by the terminal side device to perform CSI measurement on each antenna port in the QCL group; a second transmission unit configured to transmit a CSI indication signal on a resource corresponding to each antenna port in each QCL group on a QCL group basis; and a reception unit configured to receive a measurement result reported by the terminal side device after the CSI indication signal has been measured in accordance with the measurement configuration information.

In some possible embodiments of the present disclosure, parameter values corresponding to large-scale parameters of channels experienced by signals transmitted through the antenna ports of the same QCL group may be within a same predetermined range.

In some possible embodiments of the present disclosure, the large-scale parameters may include at least one of average gain, average delay, delay spread, average arrival angle, and arrival angle spread.

It should be appreciated that, the network side device in the embodiments of the present disclosure may refer to that mentioned in FIGS. 1-6 with a same or similar beneficial effect, and thus will not be particularly defined herein.

Figure 8:
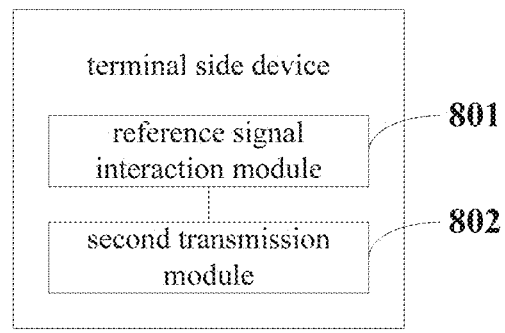
FIG. 8 is a schematic view showing a terminal side device according to some embodiments of the present disclosure.

The present disclosure further provides in some embodiments a terminal side device which, as shown in FIG. 8, includes: a reference signal interaction module 801 configured to interact uplink reference signal measurement or downlink reference signal measurement with a network side device, so as to divide antenna ports of the network side device into QCL groups, each QCL group being an antenna port group established in accordance with a QCL relationship among the antenna ports; and a second transmission module 802 configured to perform data transmission in accordance with the QCL groups.

In some possible embodiments of the present disclosure, during the interaction of the downlink reference signal measurement between the reference signal interaction module 801 and the network side device, the terminal side device may further include: a second determination module configured to determine the QCL relationship among the antenna ports of the network side device in accordance with a measurement result; a second division module configured to divide the antenna ports into groups in accordance with the QCL relationship, so as to acquire at least one QCL groups; and a first reporting module configured to report a division mode corresponding to the at least one QCL group.

In some possible embodiments of the present disclosure, parameter values corresponding to large-scale parameters of channels experienced by signals transmitted through the antenna ports of the same QCL group may be within a same predetermined range.

In some possible embodiments of the present disclosure, the large-scale parameters may include at least one of average gain, average delay, delay spread, average arrival angle, and arrival angle spread.

In some possible embodiments of the present disclosure, the data transmission may include service data transmission or CSI transmission.

In some possible embodiments of the present disclosure, during the CSI transmission, the terminal side device may further include: a third reception module configured to receive measurement configuration information from the network side device; a second measurement module configured to perform CSI measurement on the antenna ports in the QCL group in accordance with the measurement configuration information; a calculation module configured to calculate CSI about a to-be-measured channel in the measurement configuration information in accordance with a coherent transmission mode or incoherent transmission mode; and a second reporting module configured to report the calculated CSI to the network side device.

In some possible embodiments of the present disclosure, when the calculation module calculates the CSI about the to-be-measured channel in the measurement configuration information in accordance with the coherent transmission mode, the second reporting module is further configured to report CSI corresponding to one or more QCL groups to the network side device. When the calculation module calculates the CSI about the to-be-measured channel in the measurement configuration information in accordance with the incoherent transmission mode, the second reporting module is further configured to report CSI corresponding to a combination of one or more QCL groups to the network side device.

In some possible embodiments of the present disclosure, the CSI may include channel quality information and recommended transmission parameter.

It should be appreciated that, the implementation of the terminal side device may refer to that mentioned in FIGS. 1-6 with a same or similar beneficial effect, and thus will not be particularly defined herein.

Figure 9:
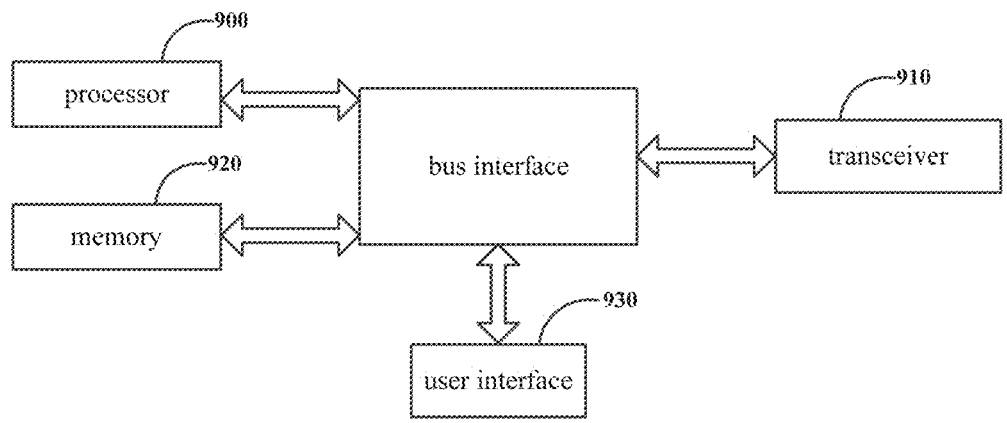
FIG. 9 is another schematic view showing the network side device according to some embodiments of the present disclosure.

The present disclosure further provides in some embodiments a network side device which, as shown in FIG. 9, includes a processor 900, a transceiver 910, a memory 920, a user interface 930 and a bus interface. The processor 900 is configured to read a program stored in the memory 920, so as to: map a codeword to at least one data layer; map the at least one data layer to at least one QCL group, the QCL group being an antenna port group established in accordance with a QCL relationship among antenna ports; and perform data transmission through the transceiver 910 in accordance with the QCL group. The transceiver 910 is configured to receive and transmit data under the control of the processor 900.

In FIG. 9, bus architecture may include a number of buses and bridges connected to each other, so as to connect various circuits for one or more processors 900 and one or more memories 920. In addition, as is known in the art, the bus architecture may be used to connect any other circuits, such as a circuit for a peripheral device, a circuit for a voltage stabilizer and a power management circuit. The bus interface may be provided, and the transceiver 910 may consist of a plurality of elements, i.e., a transmitter and a receiver for communication with any other devices over a transmission medium. With respect to different UEs, the user interface 930 may also be provided for devices which are to be arranged inside or outside the UE, and these devices may include but not limited to a keypad, a display, a speaker, a microphone and a joystick. The processor 900 may take charge of managing the bus architecture as well as general processings. The memory 920 may store therein data for the operation of the processor 900.

In some possible embodiments of the present disclosure, the processor 900 is further configured to receive through the transceiver 910 an uplink reference signal from the terminal side device.

In some possible embodiments of the present disclosure, the processor 900 is further configured to: perform uplink reference signal measurement in accordance with the uplink reference signal; determine the QCL relationship among the antenna ports in accordance with a measurement result; and divide the antenna ports in accordance with the QCL relationship into groups, so as to acquire the at least one QCL group.

In some possible embodiments of the present disclosure, the processor 900 is further configured to: transmit through the transceiver 910 a downlink reference signal to the terminal side device, the downlink reference signal being adopted by the terminal side device to perform downlink reference signal measurement and determine the QCL relationship among the antenna ports of the network side device in accordance with a measurement result; and receive through the transceiver 910 a division mode reported by the terminal side device after the antenna ports have been divided into groups in accordance with the QCL relationship.

In some possible embodiments of the present disclosure, in a non-spatial multiplexing state, data is transmitted in a single-layered manner, the processor 900 is further configured to map the at least one data layer to one or more QCL groups.

In some possible embodiments of the present disclosure, in a non-spatial multiplexing state, when data is transmitted in a multi-layered and diversified manner, the processor 900 is further configured to: when the data is transmitted in a coherent mode, map all the data layers to one QCL group, and when the data is transmitted in an incoherent mode, map the data layers corresponding to different data layer subsets to different QCL groups, and map the data layers corresponding to a same data layer subset to one or more QCL groups.

In some possible embodiments of the present disclosure, in a closed-loop spatial multiplexing state, the processor 900 is further configured to: when the data is transmitted in a coherent mode, map all the data layers to one QCL group; and when the data is transmitted in an incoherent mode, map data layers corresponding to different data layer subsets to different QCL groups, and map the data layers corresponding to a same data layer subset to a same QCL group.

In some possible embodiments of the present disclosure, in an open-loop spatial multiplexing state, the processor 900 is further configured to: when the data is transmitted in a coherent mode, map all the data layers to one QCL group; and when the data is transmitted in an incoherent mode, map all the data layers to at least two QCL groups.

In some possible embodiments of the present disclosure, in the open-loop spatial multiplexing state, the processor 900 is further configured to, when the data is transmitted in an incoherent mode, map different data layers in a same data layer subset to different QCL groups.

In some possible embodiments of the present disclosure, the processor 900 is further configured to preconfigure a limit value of the quantity of codewords on each QCL group.

In some possible embodiments of the present disclosure, the data transmission may include service data transmission or CSI transmission.

In some possible embodiments of the present disclosure, the processor 900 is further configured to, during the service data transmission, transmit corresponding control information on each QCL group in accordance with the QCL groups. The control information may be adopted to indicate DMRS port allocation, an SCID and resource allocation during the service data transmission.

In some possible embodiments of the present disclosure, in a spatial multiplexing state, when a data layer to which each codeword is mapped is mapped to one QCL group, the processor 900 is further configured to, during the service data transmission, notify an MCS of the codeword, an NDI and a RV in each QCL group.

In some possible embodiments of the present disclosure, during the CSI transmission, the processor 900 is further configured to: transmit through the transceiver 910 measurement configuration information to the terminal side device in accordance with the QCL group, the measurement configuration information being adopted by the terminal side device to perform CSI measurement on each antenna port in the QCL group; transmit through the transceiver 910 a CSI indication signal on a resource corresponding to each antenna port in each QCL group on a QCL group basis; and receive through the transceiver 910 a measurement result reported by the terminal side device after the CSI indication signal has been measured in accordance with the measurement configuration information.

In some possible embodiments of the present disclosure, parameter values corresponding to large-scale parameters of channels experienced by signals transmitted through the antenna ports of the same QCL group may be within a same predetermined range.

In some possible embodiments of the present disclosure, the large-scale parameters may include at least one of average gain, average delay, delay spread, average arrival angle, and arrival angle spread.

It should be appreciated that, the implementation of the network side device in the embodiments of the present disclosure may refer to that mentioned in FIGS. 1-6 with a same or similar beneficial effect, and thus will not be particularly defined herein.

Figure 10:
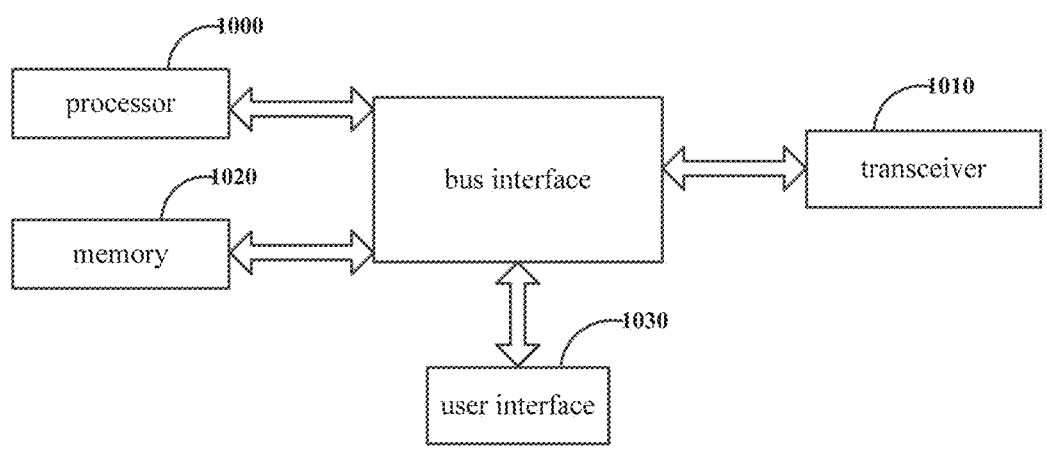
FIG. 10 is another schematic view showing the terminal side device according to some embodiments of the present disclosure.

The present disclosure further provides in some embodiments a terminal side device which, as shown in FIG. 10, includes a processor 1000, a transceiver 1010, a memory 1020, a user interface 1030 and a bus interface. The processor 1000 is configured to read a program stored in the memory 1020, so as to: interact through the transceiver 1010 uplink reference signal measurement or downlink reference signal measurement with a network side device, so as to divide antenna ports of the network side device into QCL groups, each QCL group being an antenna port group established in accordance with a QCL relationship among the antenna ports; and perform data transmission in accordance with the QCL groups.

In some possible embodiments of the present disclosure, during the interaction of the downlink reference signal measurement with the network side device through the transceiver 1010, the processor 1000 is further configured to: determine the QCL relationship among the antenna ports of the network side device in accordance with a measurement result; divide the antenna ports into groups in accordance with the QCL relationship, so as to acquire at least one QCL groups; and report through the transceiver 1010 a division mode corresponding to the at least one QCL group.

In some possible embodiments of the present disclosure, parameter values corresponding to large-scale parameters of channels experienced by signals transmitted through the antenna ports of the same QCL group may be within a same predetermined range.

In some possible embodiments of the present disclosure, the large-scale parameters may include at least one of average gain, average delay, delay spread, average arrival angle, and arrival angle spread.

In some possible embodiments of the present disclosure, the data transmission may include service data transmission or CSI transmission.

In some possible embodiments of the present disclosure, during the CSI transmission, the processor 1000 is further configured to: receive through the transceiver 1010 measurement configuration information from the network side device; perform CSI measurement on the antenna ports in the QCL group in accordance with the measurement configuration information; calculate CSI about a to-be-measured channel in the measurement configuration information in accordance with a coherent transmission mode or incoherent transmission mode; and report through the transceiver 1010 the calculated CSI to the network side device.

In some possible embodiments of the present disclosure, when calculating the CSI about the to-be-measured channel in the measurement configuration information in accordance with the coherent transmission mode, the processor 1000 is further configured to report through the transceiver 1010 CSI corresponding to one or more QCL groups to the network side device. When calculating the CSI about the to-be-measured channel in the measurement configuration information in accordance with the incoherent transmission mode, the processor 1000 is further configured to report through the transceiver 1010 CSI corresponding to a combination of one or more QCL groups to the network side device.

In some possible embodiments of the present disclosure, the CSI may include channel quality information and recommended transmission parameter.

It should be appreciated that, the implementation of the terminal side device may refer to that mentioned in FIGS. 1-6 with a same or similar beneficial effect, and thus will not be particularly defined herein.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A data transmission control method, comprising:
   mapping, by a network side device, codewords to at least one data layer, on the basis of a quantity of layers and a quantity of the codewords;
   mapping, by the network side device, the at least one data layer to at least one quasi co-location (QCL) group, the QCL group being an antenna port group established in accordance with a QCL relationship among antenna ports;
   performing, by the network side device, data transmission in accordance with the QCL group,
   wherein in a non-spatial multiplexing state, when data is transmitted in a multi-layered and diversified manner, the mapping, by the network side device, the at least one data layer to the at least one QCL group comprises: when the data is transmitted in a coherent mode, mapping, by the network side device, all the data layers to one QCL group; or, when the data is transmitted in an incoherent mode, mapping, by the network side device, the data layers corresponding to different data layer subsets to different QCL groups, and mapping the data layers corresponding to a same data layer subset to one or more QCL groups, or wherein in a closed-loop spatial multiplexing state, the mapping, by the network side device, the at least one data layer to the at least one QCL group comprises: when the data is transmitted in a coherent mode, mapping, by the network side device, all the data layers to one QCL group; or, when the data is transmitted in an incoherent mode, mapping, by the network side device, data layers corresponding to different data layer subsets to different QCL groups, and mapping the data layers corresponding to a same data layer subset to a same QCL group, or wherein in an open-loop spatial multiplexing state, the mapping, by the network side device, the at least one data layer to the at least one QCL group comprises: when the data is transmitted in a coherent mode, mapping, by the network side device, all the data layers to one QCL group; or, when the data is transmitted in an incoherent mode, mapping, by the network side device, all the data layers to at least two QCL groups.

2. The data transmission control method according to claim 1, wherein prior to mapping, by the network side device, the codewords to the at least one data layer, the data transmission control method further comprises:
receiving, by the network side device, an uplink reference signal from a terminal side device;
performing, by the network side device, uplink reference signal measurement in accordance with the uplink reference signal;
determining, by the network side device, the QCL relationship among the antenna ports in accordance with a measurement result of the uplink reference signal; and
dividing, by the network side device, the antenna ports in accordance with the QCL relationship into groups, so as to acquire the at least one QCL group.

3. The data transmission control method according to claim 1, wherein prior to mapping, by the network side device, the codewords to the at least one data layer, the data transmission control method further comprises:
transmitting, by the network side device, a downlink reference signal to the terminal side device, the downlink reference signal being adopted by the terminal side device to perform downlink reference signal measurement and determine the QCL relationship among the antenna ports of the network side device in accordance with a measurement result of the downlink reference signal; and
receiving, by the network side device, a division mode reported by the terminal side device after the antenna ports have been divided into groups in accordance with the QCL relationship.

4. The data transmission control method according to claim 1, wherein the mapping, by the network side device, the at least one data layer to the at least one QCL group further comprises: when the data is transmitted in an incoherent mode, mapping, by the network side device, different data layers in a same data layer subset to different QCL groups.

5. The data transmission control method according to claim 1, wherein prior to mapping, by the network side device, the at least one data layer to the at least one QCL group, the data transmission control method further comprises: preconfiguring, by the network side device, a limit value of the quantity of codewords on each QCL group.

6. The data transmission control method according to claim 1, wherein the data transmission comprises: service data transmission or channel state information (CSI) transmission.

7. The data transmission control method according to claim 6, further comprising: during the service data transmission, transmitting, by the network side device, corresponding control information on each QCL group in accordance with the QCL groups, wherein the control information is adopted to indicate demodulation reference signal (DMRS) port allocation, an S-channel identity (SCID) and resource allocation during the service data transmission.

8. The data transmission control method according to claim 7, wherein in a spatial multiplexing state, when a data layer to which each codeword is mapped is mapped to one QCL group, the data transmission control method further comprises: during the service data transmission, notifying, by the network side device, a modulation and coding scheme (MCS) of the codeword, a new data indicator (NDI) and a redundancy version (RV) in each QCL group.

9. The data transmission control method according to claim 6, wherein during the CSI transmission, the performing, by the network side device, the data transmission in accordance with the QCL group comprises:
transmitting, by the network side device, measurement configuration information to the terminal side device in accordance with the QCL group, the measurement configuration information being adopted by the terminal side device to perform CSI measurement on each antenna port in the QCL group;
transmitting, by the network side device, a CSI indication signal on a resource corresponding to each antenna port in each QCL group on a QCL group basis; and
receiving, by the network side device, a measurement result acquired by the terminal side device after the CSI indication signal has been measured in accordance with the measurement configuration information.

10. A non-transitory computer-readable storage medium storing therein a computer program, wherein the computer program is executed by a processor so as to implement the data transmission control method according to claim 1.

11. A data transmission control method, comprising:
interacting, by a terminal side device, uplink reference signal measurement or downlink reference signal measurement with a network side device, so as to divide antenna ports of the network side device into quasi co-location (QCL) groups, each QCL group being an antenna port group established in accordance with a QCL relationship among the antenna ports; and
performing, by the terminal side device, data transmission in accordance with the QCL groups,
wherein the data transmission comprises service data transmission or CSI transmission,
wherein during the CSI transmission, the data transmission control method further comprises:
receiving, by the terminal side device, measurement configuration information from the network side device;
performing, by the terminal side device, CSI measurement on the antenna ports in the QCL group in accordance with the measurement configuration information;
calculating, by the terminal side device, CSI about a to-be-measured channel in the measurement configuration information in accordance with a coherent transmission mode or incoherent transmission mode; and
reporting, by the terminal side device, a resultant CSI calculated by the terminal side device to the network side device.

12. The data transmission control method according to claim 11, wherein during the interaction of the downlink reference signal measurement between the terminal side device and the network side device, prior to performing, by the terminal side device, the data transmission in accordance with the QCL groups, the data transmission control method further comprises:

determining, by the terminal side device, the QCL relationship among the antenna ports of the network side device in accordance with a measurement result of the downlink reference signal;

dividing, by the terminal side device, the antenna ports into groups in accordance with the QCL relationship, so as to acquire at least one QCL groups; and reporting, by the terminal side device, a division mode corresponding to the at least one QCL group.

13. The data transmission control method according to claim 11, wherein when the terminal side device calculates the CSI about the to-be-measured channel in the measurement configuration information in accordance with the coherent transmission mode, the reporting, by the terminal side device, the resultant CSI calculated by the terminal side device to the network side device comprises: reporting CSI corresponding to one or more QCL groups to the network side device; and when the terminal side device calculates the CSI about the to-be-measured channel in the measurement configuration information in accordance with the incoherent transmission mode, the reporting, by the terminal side device, the calculated CSI to the network side device comprises: reporting CSI corresponding to a combination of one or more QCL groups to the network side device.

14. A terminal side device, comprising a processor, a memory, and a computer program stored in the memory and executed by the processor, wherein the computer program is executed by the processor, so as to implement the data transmission control method according to claim 11.

15. A network side device, comprising a processor, a memory, and a computer program stored in the memory and executed by the processor, wherein the computer program is executed by the processor, so as to implement a data transmission control method, comprising:

mapping, by the network side device, codewords to at least one data layer, on the basis of a quantity of layers and a quantity of the codewords;

mapping, by the network side device, the at least one data layer to at least one quasi co-location (QCL) group, the QCL group being an antenna port group established in accordance with a QCL relationship among antenna ports;

performing, by the network side device, data transmission in accordance with the QCL group, wherein in a non-spatial multiplexing state, when data is transmitted in a multi-layered and diversified manner, the mapping, by the network side device, the at least one data layer to the at least one QCL group comprises: when the data is transmitted in a coherent mode, mapping, by the network side device, all the data layers to one QCL group; or, when the data is transmitted in an incoherent mode, mapping, by the network side device, the data layers corresponding to different data layer subsets to different QCL groups, and mapping the data layers corresponding to a same data layer subset to one or more QCL groups, or wherein in a closed-loop spatial multiplexing state, the mapping, by the network side device, the at least one data layer to the at least one QCL group comprises: when the data is transmitted in a coherent mode, mapping, by the network side device, all the data layers to one QCL group; or, when the data is transmitted in an incoherent mode, mapping, by the network side device, data layers corresponding to different data layer subsets to different QCL groups, and mapping the data layers corresponding to a same data layer subset to a same QCL group, or wherein in an open-loop spatial multiplexing state, the mapping, by the network side device, the at least one data layer to the at least one QCL group comprises: when the data is transmitted in a coherent mode, mapping, by the network side device, all the data layers to one QCL group; or, when the data is transmitted in an incoherent mode, mapping, by the network side device, all the data layers to at least two QCL groups.

\* \* \* \* \*